United States Patent
Herman

(10) Patent No.: US 11,100,347 B2
(45) Date of Patent: Aug. 24, 2021

(54) PHOTOMETRIC STEREO OBJECT DETECTION FOR ARTICLES LEFT IN AN AUTONOMOUS VEHICLE

(71) Applicant: FORD GLOBAL TECHNOLOGIES, LLC, Dearborn, MI (US)

(72) Inventor: David M. Herman, Oak Park, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 49 days.

(21) Appl. No.: 16/299,510

(22) Filed: Mar. 12, 2019

(65) Prior Publication Data
US 2020/0293799 A1  Sep. 17, 2020

(51) Int. Cl.
*G06K 9/00* (2006.01)
*G06K 9/46* (2006.01)
(Continued)

(52) U.S. Cl.
CPC ....... *G06K 9/00832* (2013.01); *G06K 9/4604* (2013.01); *G06K 9/6202* (2013.01); *G06T 7/586* (2017.01); *H04W 4/40* (2018.02); *G06T 2207/10028* (2013.01); *G06T 2207/10152* (2013.01); *G06T 2207/30268* (2013.01)

(58) Field of Classification Search
CPC ......... G06K 9/00832; G06K 9/4604; G06K 9/6202; G06T 7/586; G06T 2207/10028; G06T 2207/30268; G06T 2207/10152; H04W 4/40
See application file for complete search history.

(56) References Cited

U.S. PATENT DOCUMENTS

| | | |
|---|---|---|
| 6,775,606 B1 | 8/2004 | Ertl et al. |
| 7,379,195 B2 | 5/2008 | Yoon et al. |
| | (Continued) | |

FOREIGN PATENT DOCUMENTS

| | | | |
|---|---|---|---|
| WO | 2018203910 A1 | 11/2018 | |
| WO | WO-2019185359 A1 * | 10/2019 | ............. G06T 5/008 |

OTHER PUBLICATIONS

Ackermann et al, A Survey of Photometric Stereo Techniques, Foundations and Trends in Computer Graphics and Vision, vol. 9, Issue 3-4 (Nov. 2015), pp. 149-254.
(Continued)

*Primary Examiner* — Dhaval V Patel
(74) *Attorney, Agent, or Firm* — Frank L. Lollo; MacMillan, Sobanski & Todd, LLC

(57) ABSTRACT

Abandoned articles left by a user departing from an autonomous vehicle are automatically detected by capturing image data including a plurality of diversely-illuminated images of a target area within a passenger cabin of the vehicle. A plurality of normal vectors are determined for respective pixels representing the target area in a normal extractor based on the images. A normal-driven map is stored in a first array in response to the plurality of normal vectors. A baseline map is stored in a second array compiled from baseline images of the target area in a nominal clean state. Differences between the normal-driven map and the baseline map indicative of an object not present in the clean state are detected in a comparator. Difficult to detect objects can be found using a single, fixed camera.

20 Claims, 5 Drawing Sheets

(51) Int. Cl.
*G06K 9/62* (2006.01)
*H04W 4/40* (2018.01)
*G06T 7/586* (2017.01)

(56) References Cited

U.S. PATENT DOCUMENTS

| | | |
|---|---|---|
| 8,081,800 B2 | 12/2011 | Irie et al. |
| 9,963,926 B2 | 5/2018 | Bradley et al. |
| 2018/0012370 A1* | 1/2018 | Aghamohammadi .... G06T 7/50 |
| 2018/0126960 A1 | 5/2018 | Reibling et al. |
| 2019/0197325 A1* | 6/2019 | Reiley ................... G06Q 10/06 |

OTHER PUBLICATIONS

Basri et al, Photometric Stereo with General, Unknown Lighting, Int J. Comput Vision (200&), vol. 72, Issue 239, pp. 239-257.

Chandraker et al, ShadowCuts: Photometric Stereo with Shadows, Proceedings of the IEEE Computer Society Conference on Computer Vision and Pattern Recognition, (CVPR 2007), Jun. 18-23, 2007.

Chen et al, PS-FCN: A Flexible Learning Framework for Photometric Stereo, arXiv: 1807.08696v1 [cs CV] Jul. 23, 2018.

Takatani et al, Enhanced Photometric Stereo with Multispectral Images, MVA (2013).

Ph.D. Thesis of Jiahua Wu, Rotation Invariant Classification of 3D Surface Texture Using Photometric Stereo, Heriot-Watt University, 2003.

Yu et al, Outdoor Photometric Stereo, IEEE International Conference on Computational Photography (ICCP), Cambridge, MA, 2013, pp. 1-8.

* cited by examiner

PHOTOMETRIC STEREO OBJECT DETECTION FOR ARTICLES LEFT IN AN AUTONOMOUS VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to inspecting a passenger cabin of an autonomous vehicle for abandoned objects, and, more specifically, to image processing for detecting unexpected objects without expensive or complicated equipment.

Autonomous vehicles are becoming available which include a set of sensors and control logic that enables driverless navigation with identification and avoidance of obstacles along a route. One application of autonomous vehicles is use as taxis that can pick up a passenger on demand.

Passengers often leave items behind in vehicles. While not usually an issue when a passenger leaves an item in his or her own car, leaving behind an item in a ride-sharing vehicle, a ride-hailing vehicle, or a taxi can be inconvenient. The problem is compounded with autonomous vehicles since there is no driver to confirm that a previous passenger took all of his or her belongings when the passenger exited the vehicle. Moreover, in an autonomous taxi scenario, a subsequent passenger may complain if the autonomous vehicle is littered with items belonging to a previous passenger.

A wide variety of objects may be left inside a vehicle (such as trash, laptops, backpacks, purses, and cell phones). For detecting such objects, interior-facing cameras can be used to image the interior before and after a passenger uses the vehicle. Known methods of object recognition using a single image, however, may not be sufficiently accurate and reliable, such as when the color/reflectivity of the vehicle interior and the abandoned object are similar. For example, a black laptop may be left on a black leather seat. It likely that object recognition using a single image may not detect the laptop. In order to detect objects in such circumstances, more expensive hardware solutions have been considered for detecting the visually similar objects, such as using multiple overlapping camera views or using time of flight (TOF) cameras to detect the subtle changes in 3D shape. While these solutions may be technically feasible, they would require more expensive hardware and/or additional hardware. It would be very desirable to provide object detection using inexpensive hardware with few added components, including cameras or light sources for imaging purposes (e.g., by basing object illumination on changes in environmental lighting conditions such as the direction of external lighting).

SUMMARY OF THE INVENTION

In one aspect of the invention, an autonomous vehicle automatically detects an abandoned article left by a user departing from the vehicle. A camera captures image data including a plurality of diversely-illuminated images of a target area within a passenger cabin of the vehicle. A normal extractor receives the images to determine a plurality of normal vectors for respective pixels representing the target area. A first array stores a normal-driven map in response to the plurality of normal vectors. A second array stores a baseline map compiled from baseline images of the target area in a nominal clean state. A comparator is coupled to the arrays to detect differences between the normal-driven map and the baseline map indicative of an object not present in the clean state.

As used herein, "normal-driven" refers to any image processing based on photometric stereo techniques which can extract object image properties including surface normals, surface albedo, reflectance, surface roughness, surface depth (i.e., distance) from the camera, and object voxel occupancy.

DETAILED DESCRIPTION OF PREFERRED EMBODIMENTS

Figure 1:
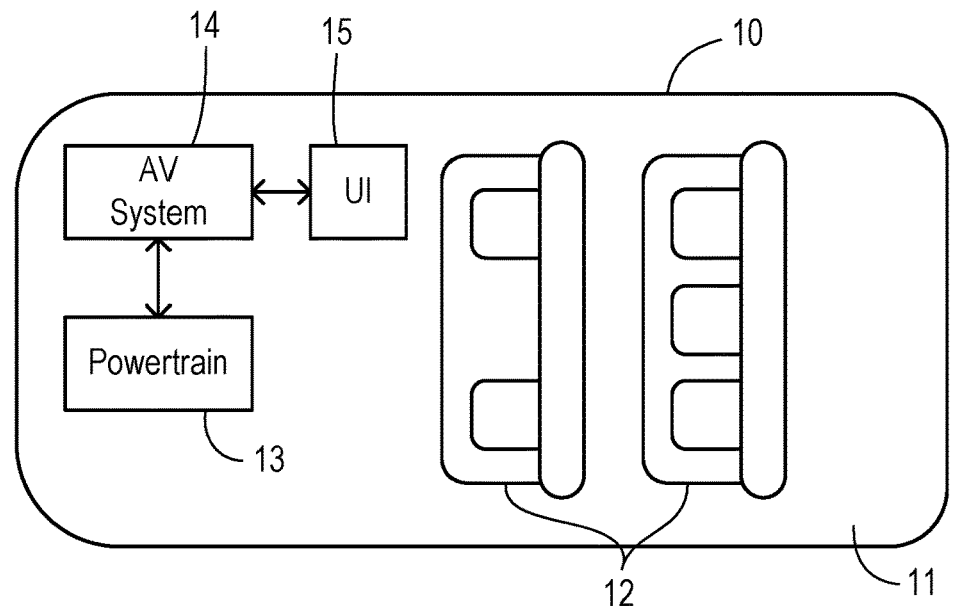
FIG. 1 is a diagram showing an autonomous vehicle of a type to be used in a ride-sharing application.

Referring to FIG. 1, an autonomous vehicle 10 has a passenger cabin 11 with passenger seating 12. A vehicle powertrain 13 propels and controls travel of vehicle 10. An autonomous vehicle (AV) control system 14 interfaces with powertrain 13 and a user interface 15. AV system 14 may further interface with a remote system supervisor or dispatch controller (not shown). By interacting with the dispatch controller and user interface 15, a user may obtain access to vehicle 10, specify a destination/route to be performed, submit payment for usage, and other functions. Once a ride is completed and the user is leaving or has exited from vehicle 10, it is desired to scan seating 12, floors, console, and other areas of cabin 11 including a cargo compartment for any objects brought into vehicle 10 by the user and not being removed when the user exits.

Figure 2:
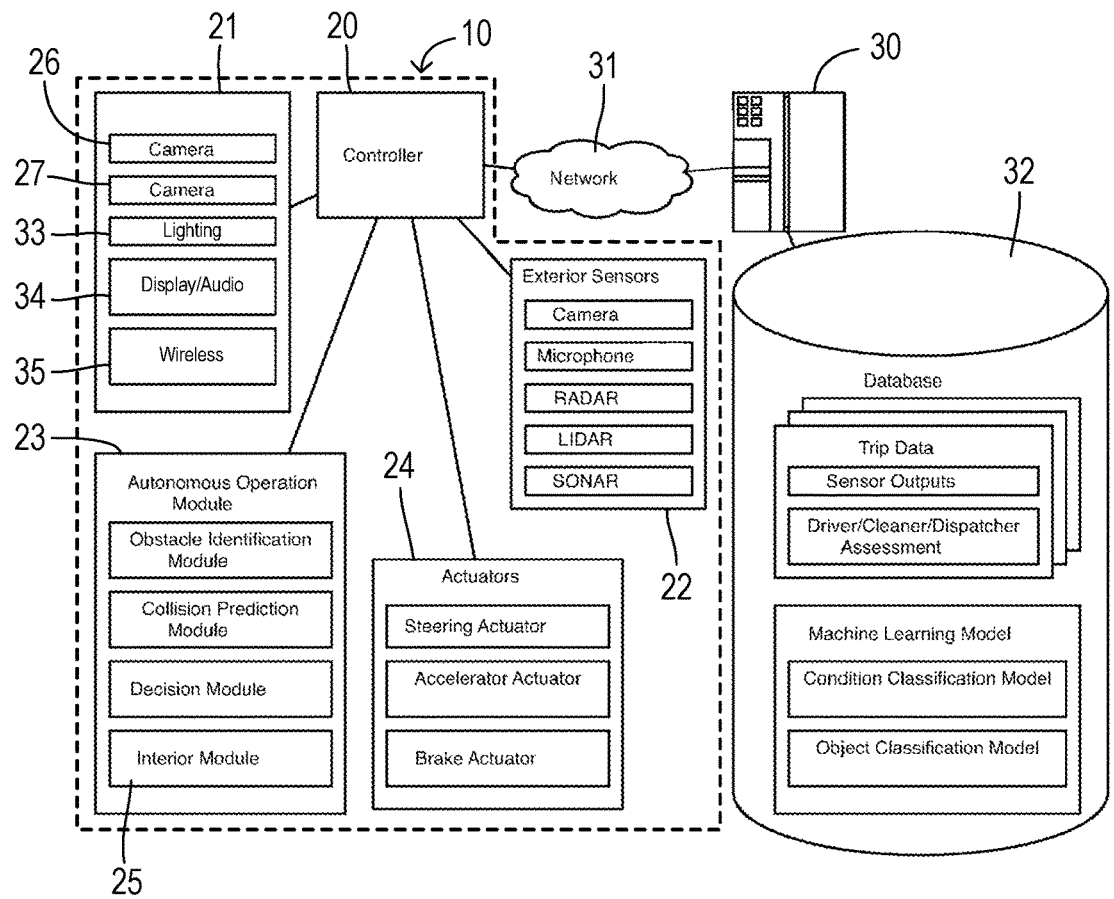
FIG. 2 is a block diagram showing an autonomous vehicle and ride-sharing system in greater detail.

An autonomous vehicle system is shown in greater detail in FIG. 2. An AV controller 20 is shown for performing autonomous navigation and collision avoidance and for detecting abandoned objects and taking responsive actions when such an object is discovered as described herein. Controller 20 is coupled to various interior accessories 21 and exterior sensors 22. For example, exterior sensors 22 include one or more cameras providing image streams and one or more microphones providing audio streams to controller 20. Exterior sensors 22 may further include sensors such as RADAR (Radio Detection and Ranging), LIDAR (Light Detection and Ranging), SONAR (Sound Navigation and Ranging), and the like.

Controller 20 incorporates an autonomous operation module 23 that functions, in part, using outputs of exterior sensors 22. Autonomous operation module 23 may include an obstacle identification module, a collision prediction module, and a decision module. The obstacle identification module analyzes the sensor outputs and identifies potential obstacles. The collision prediction module predicts which obstacle images could likely coincide with a current trajectory or current intended path of vehicle 10. The collision prediction module may evaluate the likelihood of collision with objects identified by the obstacle identification module. The decision module may make a decision to stop, accelerate, turn, etc. in order to avoid obstacles as known in the art.

The decision module may control the trajectory of the vehicle by actuating one or more actuators 24 for controlling the direction and speed of vehicle 10. For example, actuators 24 may include a steering actuator, an accelerator actuator, and a brake actuator. Thus, autonomous operation module 23 may perform autonomous navigation to a specified location, autonomous parking, and other automated driving activities known in the art.

Figure 3:
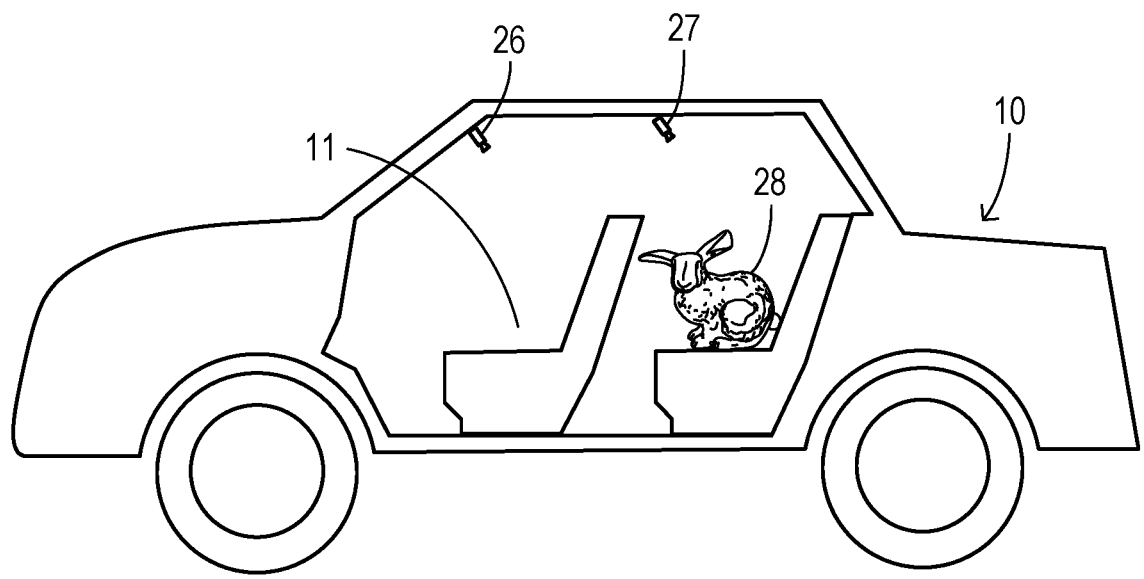
FIG. 3 is a diagram showing an autonomous vehicle containing an article that has been abandoned by a user and which must be automatically detected as a 3D object distinguishable from a clean state of the passenger cabin.

Autonomous operation module 23 may further include an interior module 25 that evaluates a state of the passenger cabin and cargo spaces of vehicle 10 according to the methods disclosed herein. Interior module 25 receives input signals one or more cameras within interior accessories 21, e.g., a visible light camera such as a still image or video camera, or other image sensors such as infrared cameras and sonar. Each camera may have a distinct target area or field of view within the passenger cabin or cargo areas. As shown in FIG. 3, cameras 26 and 27 are positioned and oriented within cabin 11 to view seating and other surfaces where an abandoned object 28 may be present.

As shown in FIG. 2, controller 20 may be in data communication with a server 30 by means of a network 31 that may include any wired or wireless network connection, including a cellular data network connection. The methods disclosed herein may be implemented by server 30, controller 20, or a combination of the two.

Server system 30 may host or access a database 32. Database 32 may include trip data captured for each trip performed by autonomous vehicle 10 (i.e., each event wherein vehicle 10 navigates to a pick up location to pick up one or more passengers and then deposits the passengers at a destination). The trip data may include an assessment of the interior to ensure readiness for a next user and/or to administer costs or issue a notification or rebuke in the event the prior user leaves behind personal objects or trash.

In order to select an appropriate response depending on the specific identity of the abandoned object(s), database 32 may include a machine learning model trained to identify and classify objects using a neural network, decision tree, clustering, Bayesian network, or other type of machine learning model.

In the prior art, object detection and classification has been performed using one or more cameras to obtain images that may contain a discernable object. Detection may be rather easy for some type of objects, such as large objects with a coloration markedly different from the background. For many of the types of objects that may be present within the passenger cabin, however, known methods of detection based on image inspection can often be unsuccessful (such as a thin object with contrast from the surrounding area like a tablet or cellphone). For example, stereo camera disparity measurements (i.e., using two separated cameras) may be noisy in such cases due to lack of feature points to perform matches between the two images. In order to provide an increased ability to detect such objects, the invention employs photometric techniques as described below. Preferably, a fixed camera may be used to provide a series of images captured with different lighting characteristics, wherein the images are processed in a way that reveals depth-related information which is used as the basis for detecting objects that are otherwise difficult to detect. For obtaining the diversely-illuminated images, controller 20 is coupled to a lighting system 33 in accessories 21 having a plurality of light sources at diverse locations within the passenger cabin. As described in more detail below, controller 20 analyzes the ambient light that is illuminating the passenger cabin and then selects a plurality of lighting configurations for capturing the images to be processed using photometric techniques.

Interior accessories 21 include a human-machine interface (HMI) 34 which may include a graphic display panel, audio speakers, and/or interior and exterior lights for providing messages (e.g., text, synthesized speech, or blinking lights) to inform a user about an abandoned object. A wireless transceiver 35 may also be provided in order to deliver messages to the user after departing from vehicle 10.

Figure 4:
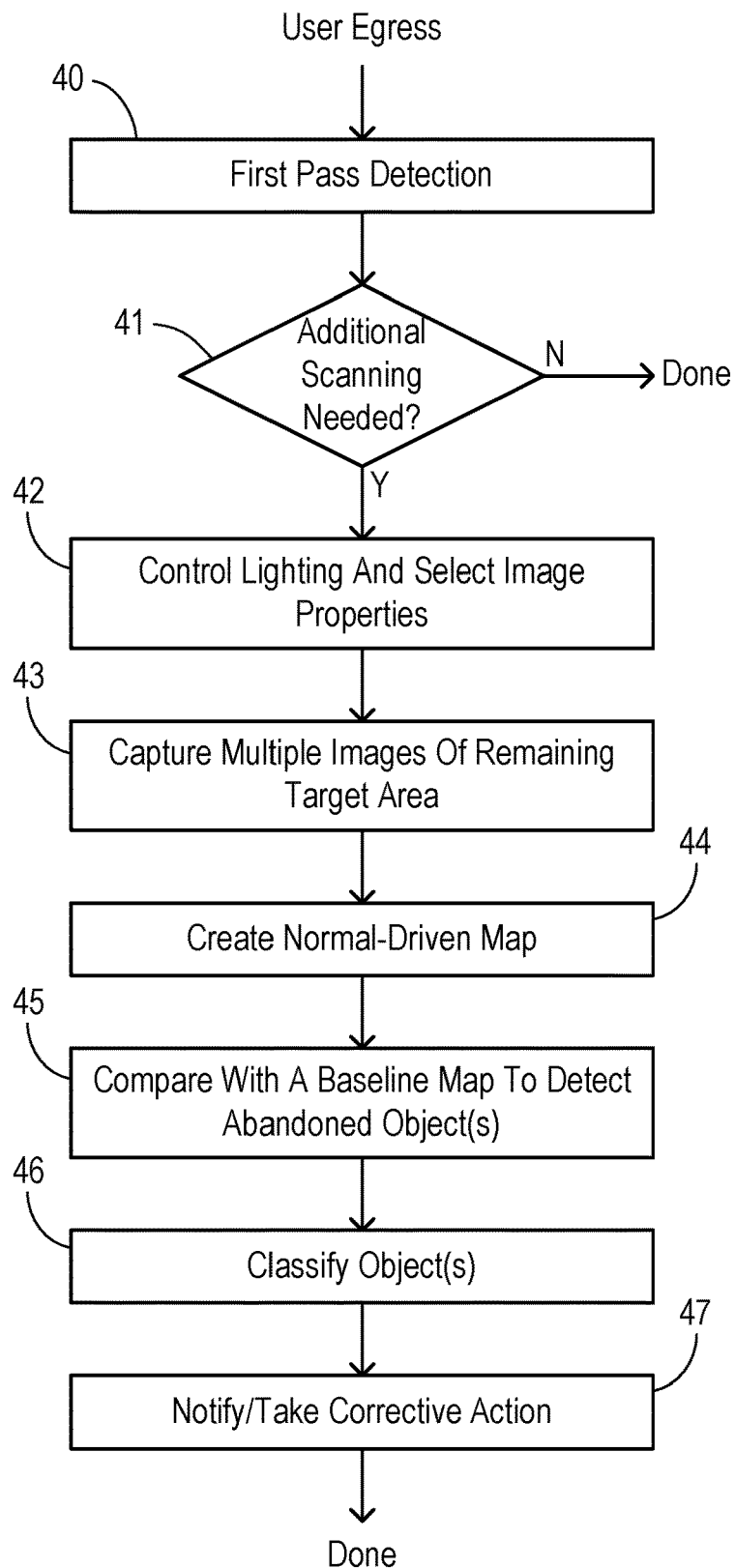
FIG. 4 is a flowchart showing one preferred method of the invention.

One preferred method of the invention is shown in FIG. 4. When a user (i.e., vehicle occupant) begins to exit or has exited the vehicle, a first-pass object detection may be performed in step 40. The first-pass detection may use a known method which is less robust but quicker to perform, in order to check for any easily detectable objects. For example, a large backpack or suitcase having a strongly contrasting color or reflectivity may be detected without requiring any special imaging sequence. In some embodiments, whenever a single object is detected then further detection can be skipped since the necessity to warn the user has already been identified. In step 41, a check is performed to determine whether additional scanning is needed. If the first-pass detection already reveals abandoned objects and no further scanning is desired, then the method is done. If no objects are detected in the first-pass detection or there are additional target areas within the passenger cabin for which no objects were detected and it is desired to ascertain whether additional objects are present, then the method proceeds to step 42.

In step 42, a photometric stereo imaging analysis is initiated by controlling the lighting devices illuminating the target area(s) in a way that produces diverse illumination for respective images within a series of images as used for photometric stereo surface evaluation. The diversely-illuminated images are processed according to reflectance models which estimate surface properties of objects from transformations of image intensities that arise from illumination changes, e.g., resulting in the determination of the direction of surface normals at corresponding pixel within the series of images. Also in step 42, image properties such as exposure time or other parameters are controlled for the images. In step 43, multiple images are captured of the target areas for which additional scanning are needed, wherein each image uses a respective lighting configuration. Using photometric stereo image analysis, a "normal-driven" map is created in step 44. The normal driven map may be comprised of actual surface normals or albedos, or can be based on further processing to determine i) depth (i.e., distance) from the imaging camera to the object at each pixel in the image or ii) a three-dimensional voxel occupancy map.

More specifically, a first embodiment of the normal-driven map may include vector values indicating respective orientations of surface normal vectors which are calculated for each pixel within the target area. Each normal vector may be comprised of numerical values defining the vector or may be comprised of other multi-dimensional values such as hue and brightness levels for representing a three-dimensional object. In a second embodiment, the normal-driven map may be comprised of depth values for each pixel, wherein differences between depth values at different locations identify an outline of an abandoned object. In another embodiment, the normal-driven map may be comprised of a three-dimensional data set wherein each element in the data set is comprised of voxel occupancy values. Each voxel may have of two numerical values, respectively identifying either the presence or the absence of an object at the corresponding voxel.

The controller is preprogrammed with a baseline map compiled from images collected at a time when the passenger cabin is in a clean state (i.e., without any foreign objects) using the same type of normal-driven map to be collected during vehicle operation. The derived normal-driven map is compared with the baseline map in step 45 to detect any abandoned objects which may be present. In step 46, any detected objects are classified according to a plurality of predetermined object classifications. For example, using the shape, depth, or other surface properties of a detected object, a classifier which is responsive to the detected differences between the normal-driven and baseline maps assigns one of the predetermined object classifications to the object. Based on the assigned classification, a predetermined action is selected in step 47 to notify the user or otherwise take corrective action, such as moving the vehicle to a cleaning station.

Typically, the standard photometric approaches require three diversely illuminated images. Based on known photometric stereo approaches, the surface normal may be determined. At lower ambient lighting levels, the interior cabin lighting for each image in a series can be individually controlled to diversely illuminate any interior objects during each image captured by one or more cameras. At moderate lighting conditions with one or more dominant lighting sources e.g., dusk or dawn when ambient light is dominated from a single source rather than throughout the skydome). For determining the ambient: lighting conditions, the vehicle employs various sensors such as photodetectors and cameras. For example, exterior and/or interior images may be captured to understand the external lighting conditions, thereby determining an origin of light illumination for calculating the photometric stereo solution for the surface normals. Sun location can also be determined using a navigation (GPS) system to determine vehicle location and orientation together with a solar ephemeris. Known methods for the photometric stereo calculations include Yu et al., *Outdoor Photometric Stereo*, Computational Photography (ICCP), 2013 IEEE International Conference, 2013, and a technique using multi-colored light sources in Christensen et al, *Three-dimensional Shape From Color Photometric Stereo*, International Journal of Computer Vision, 13.2 (1994): 213-227. The interior of the passenger cabin may be subject to shadows (passing onto an object which may impact photometric stereo calculations, Evaluating the surface normals in the presence of shadows can be conducted as described in Chandraker et al, *ShadowCuts: Photometric Stereo With Shadows*, Computer Vision and Pattern Recognition, CVPR'07, IEEE Conference, 2007. Additional details regarding the use of photometric stereo are disclosed in Ackermann et al, *A Survey of Photometric Stereo Techniques*, Foundations and Trends in Computer Graphics and Vision, 9.3-4 (2015), pp. 149-254, and in Basri et al, *Photometric Stereo with General, Unknown Lighting*, International Journal of Computer Vision 72.3, (2007), pp 239-257.

Normal-driven maps for the nominal state and the post-passenger state are be compared to identify any discrepancies. As mentioned above, the surface normal maps may be optionally converted into a depth map or voxel occupancy map. Regardless of the specific representation, the two maps are compared to determine any significant differences above a nominal noise level inherent in the particular photometric approach. For example, a depth map comparison may have an error of ±3 mm standard deviation per pixel. Therefore, the presence of multiple pixels that are ≥10 mm higher than surrounding materials and/or the nominal depth map would indicate an object on that location. The surface normal, depth map, or voxel representation discrepancy (e.g., a cluster of pixels with a higher than nominal surface height due to an object upon the seat/floor/trim of the cabin) may be used to classify the object based on dimensions or surface normals. For example, a book may be roughly rectangular and would have a 3D size within some range. In another case, a water bottle depth map or surface normal map when sitting on the floor of the cabin would be rather distinct and easily classified. Methods of classification that can be used include a template matching method, a cascade of weak computer vision classifiers if the map is converted into an image using a lookup table, or a classifier based on a neural network.

After detection and classification, the corrective action taken by the vehicle may be based on a particular business logic. For example, if a large object is left in the cabin such as a backpack, the prior rider may be notified of a lost object in order to plan a meeting between the original vehicle and the prior rider. In other cases, if trash (e.g., a water bottle) is left in the cabin then the user may be warned or fined for leaving trash in the vehicle. The invention could also be used during vehicle operation to warn a user about articles that will need to be removed during egress.

Figure 5:
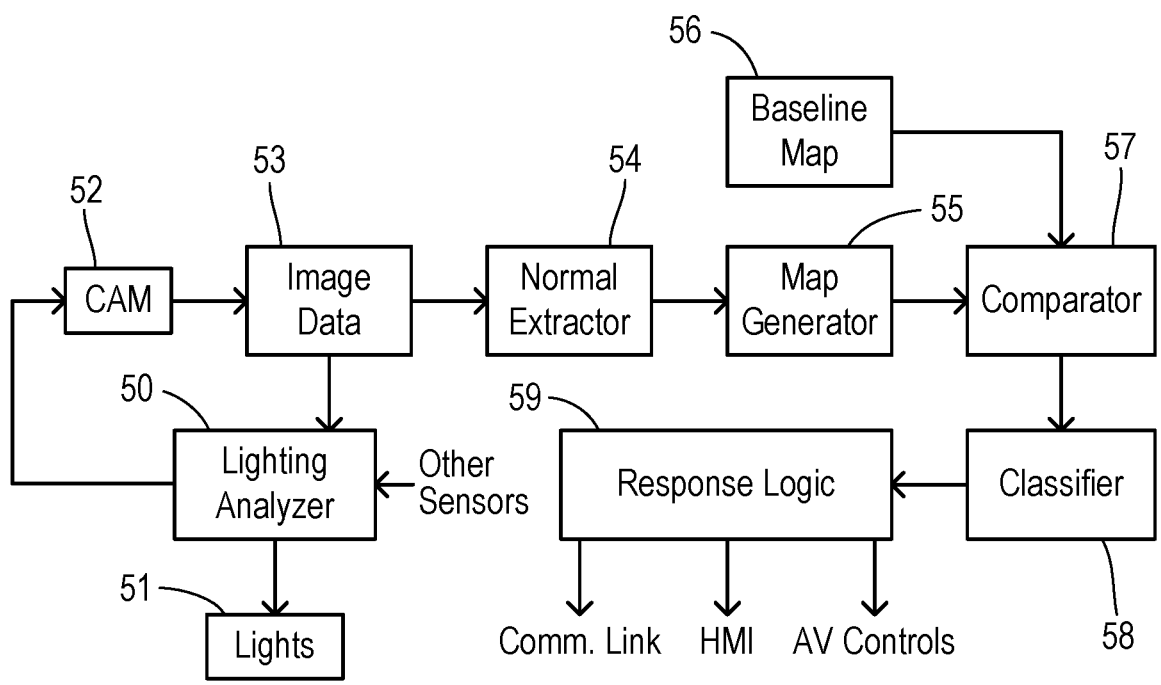
FIG. 5 is a block diagram of vehicle apparatus adapted to perform the method of FIG. 4.

FIG. 5 shows one preferred control architecture according to the invention wherein a lighting analyzer 50 detects ambient light conditions and determines a plurality of lighting configurations to be produced by light sources within the passenger cabin to derive a plurality of diversely-illuminated target images that can be input to a photometric stereo analysis. Quantification of the ambient light conditions is determined in response to image data 53 from a camera 52 and data from other sensors such as exterior cameras and or photodetectors. Based on the selected lighting configurations, analyzer 50 commands interior cabin lights 51 to turn on and off selectively in coordination with signals sent to camera 5267 or capturing the plurality of diversely illuminated images of a target area within a field of view of camera 52. By capturing a plurality of images with different illumination characteristics, depth-related information can be obtained using only one fixed camera. Thus, object detection is improved without additional hardware.

The captured image data including the plurality of diversely illuminated images of the target area is provided to a normal extractor 54 which applies the known methods based on variability of the reflectance at each pixel covering a three-dimensional object to determine corresponding normal vectors which quantify the surface normals at each pixel in the images. The normal vectors are provided to a map generator 55 which preferably includes an array for storing a normal-driven map as a two-dimensional or three-dimensional matrix. The array contains respective vector values, depth values, or voxel occupancy values as described above. A baseline map 56 likewise contains an array for storing the baseline map previously compiled from baseline images of the target area in a nominal clean state. The maps from the arrays are compared in a comparator 57 which detects differences between the maps to reveal any objects which were not present in the clean state. The detected differences are provided from comparator 57 to a classifier 58 which has been trained in advance to respond to the shapes indicated by the detected differences. Classifier 58 assigns one of a plurality of predetermined object classifications to each abandoned object revealed by the detected differences. The assigned object classification is provided to an intervention/response logic 59 for implementing rules which select from predetermined actions correlated with the various object classifications. Response logic 59 may interact with autonomous vehicle controls in order to navigate the vehicle to a cleaning station. Alternatively, response logic 59 may interact with an HMI (such as a display panel, vehicle lights, or a horn) to notify a user of the presence of the abandoned object. Alternatively, response logic 59 may interact with a wireless communication link to provide a remote notification after the user has left the vicinity of the vehicle.

Figure 6:
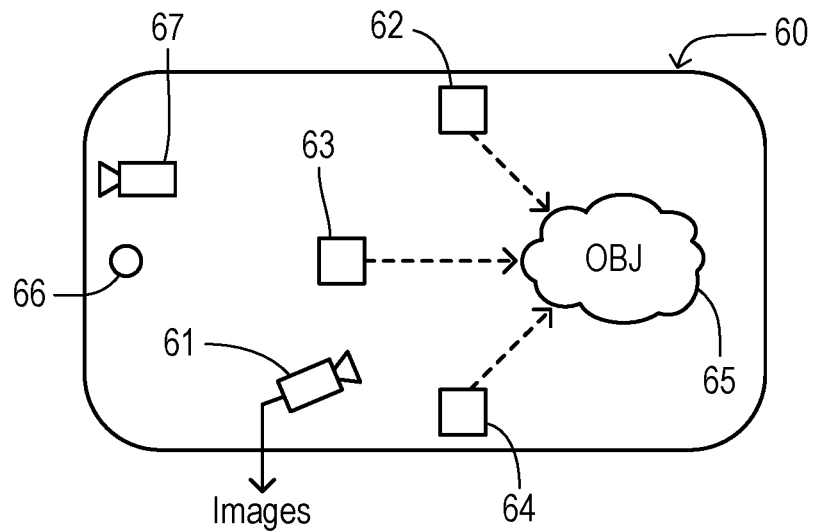
FIG. 6 is a schematic diagram showing an arrangement of lighting sources, a camera, and ambient light sensors for obtaining the diverse lighting conditions according to one embodiment of the invention.
Figure 7:
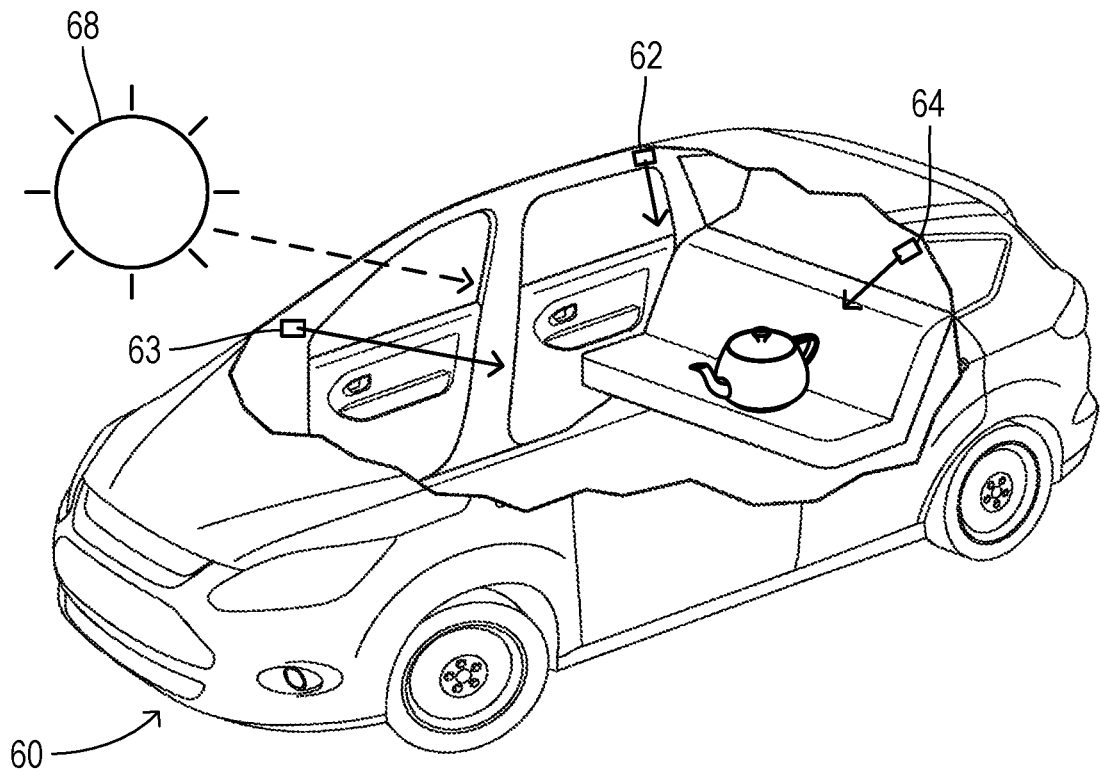
FIG. 7 is a perspective view showing diverse lighting of an object to be detected.

FIG. 6 shows aspects of the object illumination used in the invention in greater detail. A vehicle 60 includes a fixed camera 61 for providing inspection images to be used for detecting objects at the appropriate time. Lighting devices 62, 63, and 64 are disposed at diverse locations in the passenger cabin, such as different locations on the roof of the cabin, on the roof pillars, or on other interior trim surfaces of the vehicle (e.g., doors, dashboard, or seats). An object 65 within the passenger cabin can thus be selectably illuminated from different angles so that the plurality of diversely-illuminated images can be obtained using camera 61. The capabilities of the various lighting devices to differentially illuminate an object depends, in part, on the ambient lighting. Thus, camera 61 and other sensors such as a photodetector 66 and an exterior camera 67 can be used to ascertain the ambient light conditions so that the actual illumination of object 65 during the activation of each selected lighting configuration can be more accurately known (i.e., the sum of the ambient lighting and the supplemental light from lighting devices 62-64). In particular, a low sun angle can be detected in order to assess directionality of the ambient light. As shown in FIG. 7, when Sun 68 is at a low angle then the incident sunlight provides a directional illumination of object 65 on a vehicle seat. Consequently, the selected lighting conditions may include at least one configuration with increased reliance on light source 64 or other sources which provide illumination complementary to the incoming sunlight.

Figure 8:
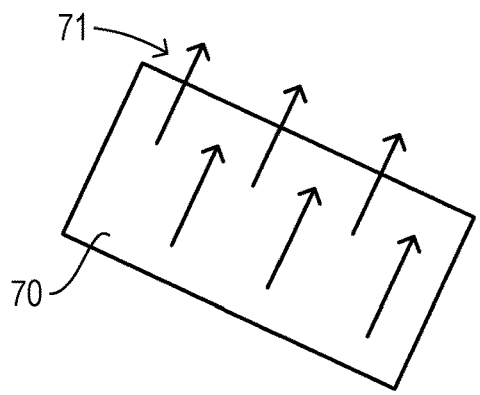
FIG. 8 is a diagram showing surface normals of a flat vehicle surface.
Figure 9:
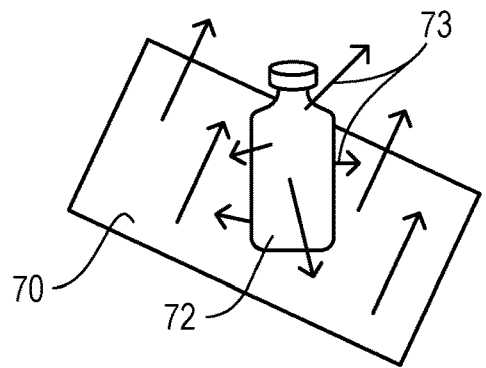
FIG. 9 is a diagram showing surface normals of an abandoned object remaining on the surface of FIG. 8.
Figure 10:
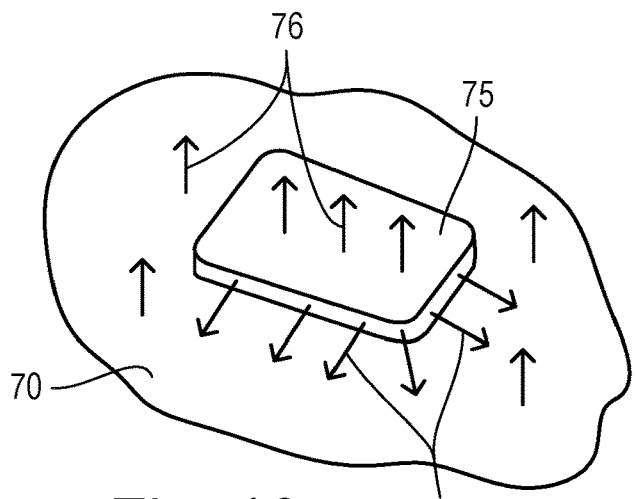
FIG. 10 is a diagram showing surface normals of a flat, thin object lying on a flat surface.
Figure 11:
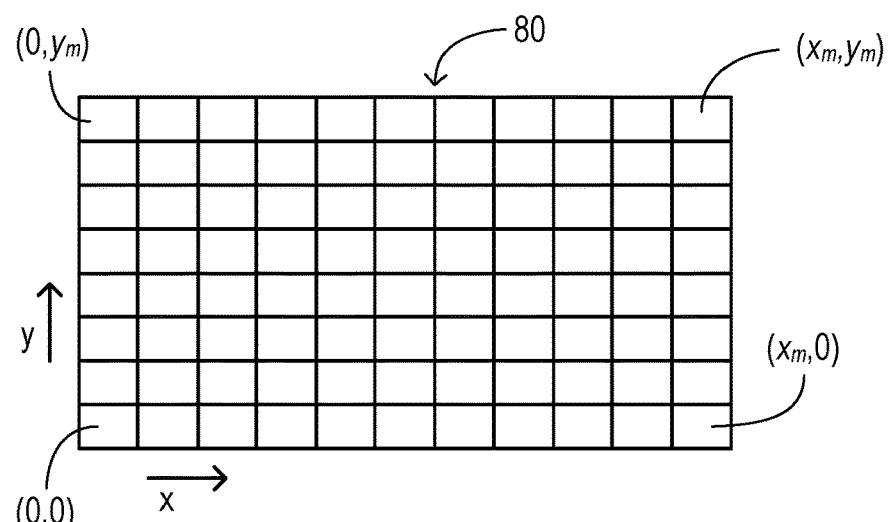
FIG. 11 shows an array (or portion of an array) for storing a map according to a preferred embodiment, wherein each cell of the array can contain various multi-dimensional normal-driven values.

FIGS. 8-10 show examples of surface normals for pixels in a target area with different objects present. FIG. 11 shows a preferred type of array 80 for storing the normal-driven map in response to the normal vectors determined by the normal extractor and for storing the baseline map. For a two-dimensional representation of a map, array 80 defines a rectangular grid of cells along perpendicular x and y directions accommodating an image size of n by m pixels. Each cell corresponds to a respective image pixel and stores a corresponding vector value or a depth value. For a three-dimensional representation, array 80 would include additional cells in the z direction for storing all the voxel occupancy values. In each case, the values in each cell are driven by the surface normal vectors derived using photometric stereo. FIG. 8 shows a flat, empty surface 70 in the target area with a plurality of surface normals 71 which are used to generate the baseline map. During an inspection for abandoned objects, a water bottle 72 is present on surface 70 as shown in FIG. 9. Surface normals 73 derived from images depicting bottle 72 have orientations radically different from normals 71 of the baseline map. Furthermore, the specific orientations among the vector values or the resulting depth values in the normal-driven map are sufficiently unique to enable a classification of the object as a water bottle. In FIG. 10, a flat, thin object 75 such as a cellphone or tablet is present on surface 70. Some surface normals 76 for the underlying surface and a top surface of object 75 share a similar orientation. However, normal vectors 77 along visible edges of object 75 are distinctly different and enable reliable detection of the flat, thin object.

What is claimed is:

1. An autonomous vehicle for automatically detecting an abandoned article left by a user departing from the vehicle, comprising:
    a camera capturing image data including a plurality of diversely-illuminated images of a target area containing the abandoned article within a passenger cabin of the vehicle;
    a normal extractor receiving the images to determine a plurality of normal vectors for respective pixels representing the target area;
    a first array storing a normal-driven map in response to the plurality of normal vectors;
    a second array storing a baseline map compiled from baseline images of the target area in a nominal clean state; and
    a comparator coupled to the arrays to detect differences between the normal-driven map and the baseline map indicative of an object not present in the clean state.

2. The vehicle of claim 1 wherein the arrays are comprised of vector values indicating respective orientations of the respective normal vectors.

3. The vehicle of claim 1 wherein the arrays are comprised of depth values, and wherein the vehicle further comprises a map generator receiving the plurality of normal vectors to determine respective depth values for each respective pixel.

4. The vehicle of claim 1 wherein the arrays are comprised of voxel occupancy values, and wherein the vehicle further comprises a map generator receiving the plurality of normal vectors to determine respective voxel occupancy values for a three-dimensional region including the target area.

5. The vehicle of claim 1 further comprising:
    a plurality of light sources at diverse locations in the cabin; and
    a lighting analyzer responsive to ambient lighting illuminating the cabin in order to select a plurality of lighting configurations respectively produced by the light sources during capture of each of the respective diversely-illuminated images.

6. The vehicle of claim 1 further comprising a classifier responsive to the detected differences to assign one of a plurality of predetermined object classifications to the object.

7. The vehicle of claim 6 further comprising intervention logic selecting a predetermined action according to the assigned object classification.

8. The vehicle of claim 7 wherein the predetermined action is comprised of transmitting a message to the user indicating the presence of the detected object.

9. The vehicle of claim 8 wherein the message is transmitted wirelessly to a portable device of the user.

10. The vehicle of claim 8 wherein the message is transmitted as a visible or audible signal produced by the vehicle.

11. The vehicle of claim 7 wherein the predetermined action is comprised of autonomously driving the vehicle to a cleaning station.

12. A method of automatically detecting an abandoned article left by a user departing from an autonomous vehicle, comprising the steps of:
    capturing image data including a plurality of diversely-illuminated images of a target area containing the abandoned article within a passenger cabin of the vehicle;
    determining a plurality of normal vectors for respective pixels representing the target area in a normal extractor based on the images;
    storing a normal-driven map in a first array in response to the plurality of normal vectors;
    storing a baseline map in a second array compiled from baseline images of the target area in a nominal clean state; and
    detect differences between the normal-driven map and the baseline map indicative of an object not present in the clean state.

13. The method of claim 12 wherein the maps are comprised of vector values indicating respective orientations of the respective normal vectors.

14. The method of claim 12 wherein the maps are comprised of depth values, and wherein the method further comprises the step of generating the respective depth values for each respective pixel in response to the plurality of normal vectors.

15. The method of claim 12 wherein the maps are comprised of voxel occupancy values for a three-dimensional region including the target area, and wherein the method further comprises the step of generating the voxel occupancy values in response to the plurality of normal vectors.

16. The method of claim 12 further comprising the steps of:
    analyzing ambient illumination of the cabin in order to select a plurality of lighting configurations for capturing each of the respective diversely-illuminated images; and
    activating a plurality of light sources at diverse locations in the cabin to produce the selected lighting configurations.

17. The method of claim 12 further comprising the step of assigning one of a plurality of predetermined object classifications to the object a classifier in response to the detected differences.

18. The method of claim 17 further comprising the step of selecting a predetermined intervention action according to the assigned object classification.

19. The method of claim 18 wherein the selected action is comprised of transmitting a message to the user indicating the presence of the detected object.

20. The method of claim 18 wherein the transmitted message is comprised of a visible or audible signal produced by the vehicle.

* * * * *